United States Patent
Healy et al.

(10) Patent No.: US 9,254,908 B2
(45) Date of Patent: Feb. 9, 2016

(54) FIXING MEANS

(75) Inventors: Daren Healy, Bristol (GB); Rizal Hafiz, Bristol (GB)

(73) Assignee: Airbus Operations Limited, Bristol (GB)

( * ) Notice: Subject to any disclaimer, the term of this patent is extended or adjusted under 35 U.S.C. 154(b) by 222 days.

(21) Appl. No.: 13/557,352

(22) Filed: Jul. 25, 2012

(65) Prior Publication Data

US 2013/0047385 A1 Feb. 28, 2013

(30) Foreign Application Priority Data

Aug. 22, 2011 (GB) .................................. 1114436.7

(51) Int. Cl.
*B64C 1/40* (2006.01)
*F16L 3/127* (2006.01)
*H02G 3/32* (2006.01)
*F16B 7/04* (2006.01)

(52) U.S. Cl.
CPC ................. *B64C 1/406* (2013.01); *F16B 7/042* (2013.01); *F16L 3/127* (2013.01); *H02G 3/32* (2013.01); *Y10T 24/45* (2015.01)

(58) Field of Classification Search
CPC .............. F16L 3/127; F16L 3/123; F16L 3/13
USPC ........ 24/114.5; 248/62, 63, 60, 58, 74.3, 74.4
See application file for complete search history.

(56) References Cited

U.S. PATENT DOCUMENTS

| | | | | |
|---|---|---|---|---|
| 4,602,760 | A * | 7/1986 | Tiefenbach et al. | 248/544 |
| 5,845,883 | A * | 12/1998 | Meyer | 248/73 |
| 5,905,231 | A * | 5/1999 | Houte et al. | 174/68.3 |
| 7,384,018 | B2 * | 6/2008 | Moretto | 248/74.1 |

FOREIGN PATENT DOCUMENTS

GB    1576589    10/1980

OTHER PUBLICATIONS

Search Report for GB1114436.7 dated Dec. 12, 2011.

* cited by examiner

*Primary Examiner* — Jack W Lavinder
(74) *Attorney, Agent, or Firm* — Nixon & Vanderhye P.C.

(57) ABSTRACT

Fixing means is disclosed for securing an equipment element to a substrate.

10 Claims, 4 Drawing Sheets

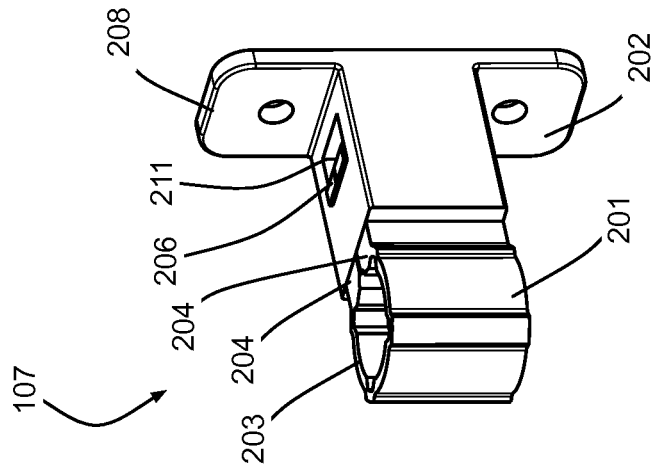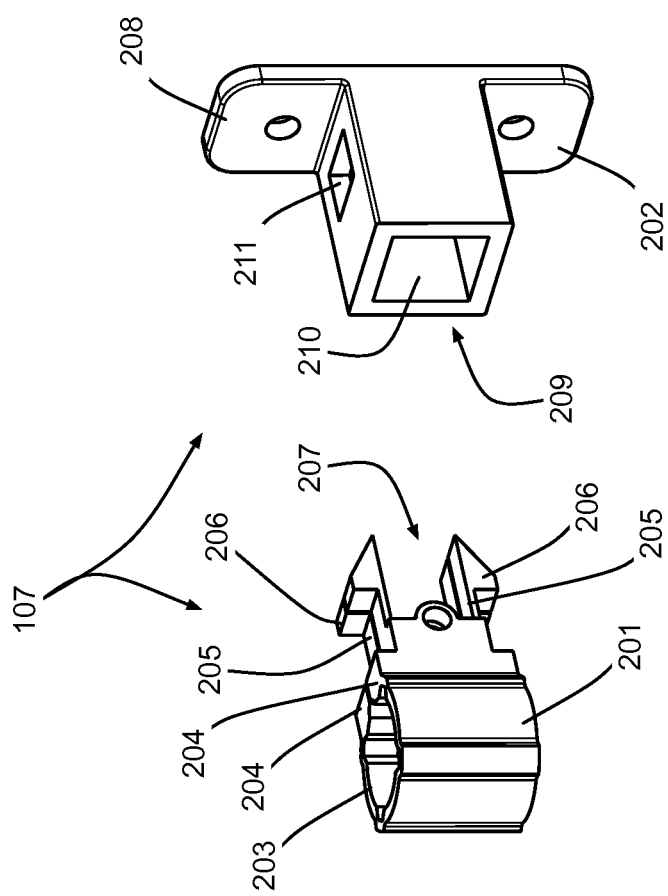
Figure 2c
Figure 2b
Figure 2a

FIXING MEANS

This application claims priority to GB Patent Application No. 1114436.7 filed Aug. 22, 2011, the entire contents of which is hereby incorporated by reference.

FIELD OF INVENTION

The present invention relates to fixing means for fixing an equipment element to a substrate.

BACKGROUND OF THE INVENTION

Fixing means are commonly used, for example in aircraft, for fixing pieces of equipment to supporting structures or substrates. Such fixing means commonly comprise combinations of clamps, brackets or plates connected together with bolts or other suitable means. Such fixing means can be relatively time consuming and difficult to install, particularly in complex structures. Furthermore, such fixing means commonly have a high part count, which tends to increase cost and weight.

SUMMARY OF THE INVENTION

Embodiments of the invention provide fixing means for fixing an equipment element to a substrate, the fixing means comprising:

a first part comprising supporting means for supporting an equipment element and a first clip part; and a second part comprising securing means for securing the fixing means to a substrate and a second clip part, the first and second clip parts being arranged to clip together so as to fix the equipment element to the substrate.

The first and second clip parts may be arranged so as to be manually separable. The first and second clip parts may comprise a male part and a female part, the male part comprising two opposing clip elements, each clip element being split so as to provide redundancy for each clip element. The supporting means may comprise two flanges for securing the equipment element, each flange being integral with the first clip part. The supporting means may further comprise clamping means arranged to clamp the flanges together so as to fix the supporting means to the equipment element. The clamping means may be located so as to be covered by the first or second clip part when the clip parts are clipped together.

BRIEF DESCRIPTION OF THE DRAWINGS

Embodiments of the invention will now be described, by way of example only, with reference to the accompanying drawings in which:

FIGS. 2a, 2b & 2c are isometric views of fixing means for fixing an equipment element to a substrate in the aircraft of FIG. 1;

DETAILED DESCRIPTION OF EMBODIMENTS OF THE INVENTION

Figure 1:
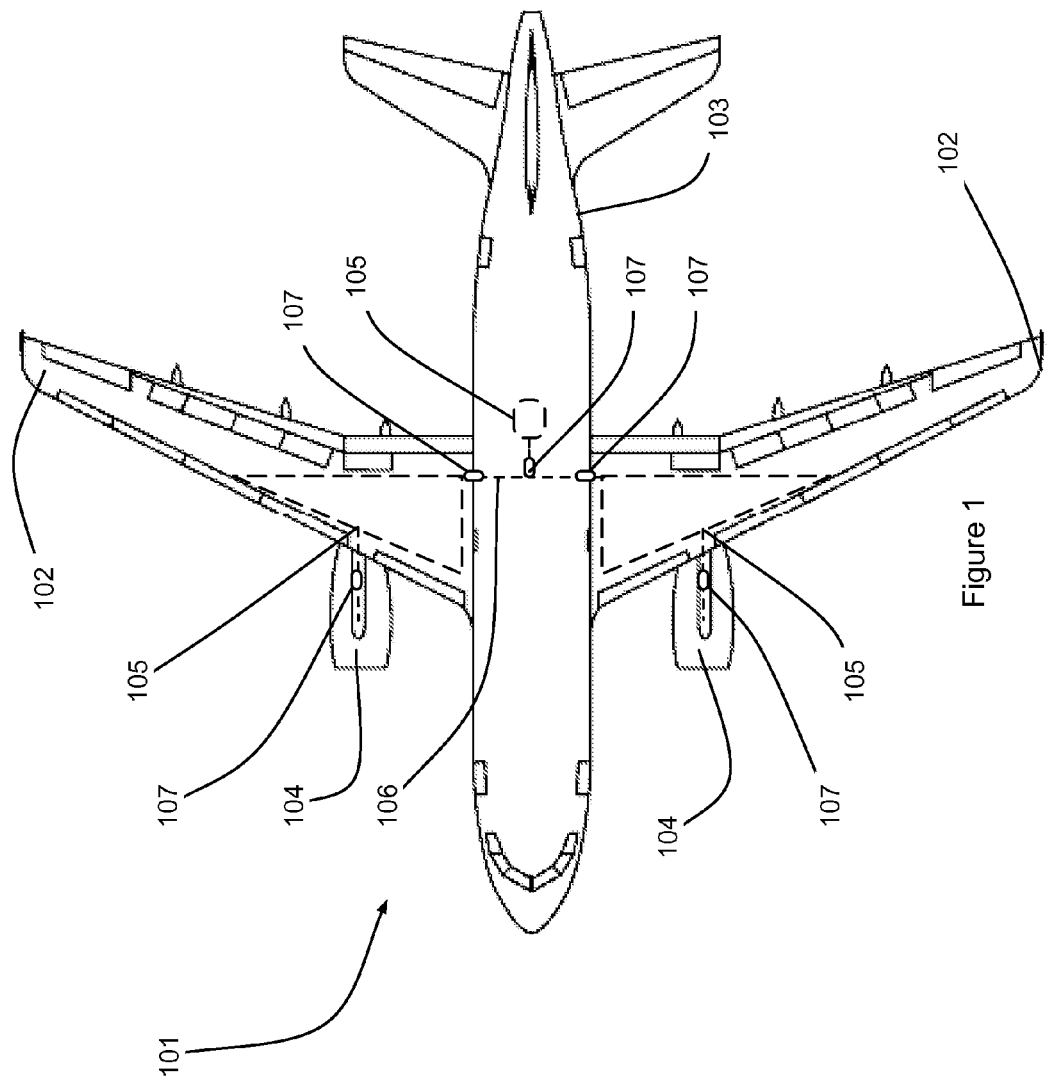
FIG. 1 is a schematic plan view of an aircraft.

With reference to FIG. 1, an aircraft 101 comprises a pair of wings 102 faired into a fuselage 103. Each of the wings 102 carries a respective engine 104. The aircraft comprises control and monitoring equipment 105 for controlling and monitoring elements of the aircraft 101. The control and monitoring equipment 105 comprises equipment elements 106, in the form of one or more runs of pipes, cables, wires or other elements that are each secured at suitable points to a substrate in the from of the structure of the aircraft 101. In the present embodiment, the equipment elements 106 are secured to the structure of the aircraft 101 using fixing means 107.

With reference to FIGS. 2a & 2b, each fixing means 107 comprises a first part 201 and a second part 202. The first part comprises support means 203, which, in the present embodiment, is in the form of an open collar for supporting or fixing round a tubular equipment element such as a pipe or cable (not shown). The collar 203 is formed into two radially extending flanges 204 at its open ends. The distal ends of each of the flanges 204 each comprise a pair of arms 205 that each comprises an outward facing projection 206. The arms 205 and projections 206 comprised by one of the flanges 204 correspond to the arms 205 and projections 206 of the other flange 204. In other words, the arms 205 and projections 206 are paired across the flanges 204. The arms 205 and projections 206 together provide the male part 207 of a clip mechanism. The arms 205 are resiliently biased into the position shown in FIG. 2a.

With reference to FIG. 2b, the second part 202 of the fixing means 107 comprises securing means 208 in the form of a flanged base for fixing the second part 202 to the aircraft structure by any suitable means such as bolting, riveting or bonding or any combination thereof. The base 208 provides the female part 209 of the clip mechanism in the form of a socket 210. The socket 210 defines two opposing holes 211 (only one shown in FIG. 2b) that each correspond to a pair of the projections 206.

With reference to FIG. 2c, pushing the male part 207 into the female part 209 causes the pairs of projections 206 to move towards each other as the arms 205 bend towards each other. When the male part 207 is fully located within the female part 209 the resilient biasing of the arms 205 moves the projections 206 into their respective holes 211 so as to clip or fix the two parts 207, 209 together and thus secure the equipment element to the substrate.

Figure 3B:
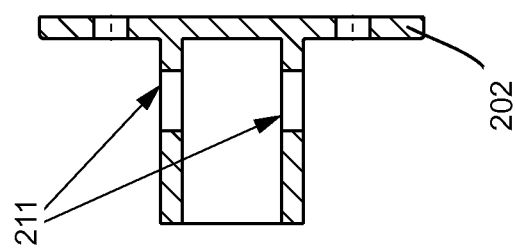
FIGS. 3a, 3b & 3c are cross sectional side views of the fixing means of FIG. 2.
Figure 3A:
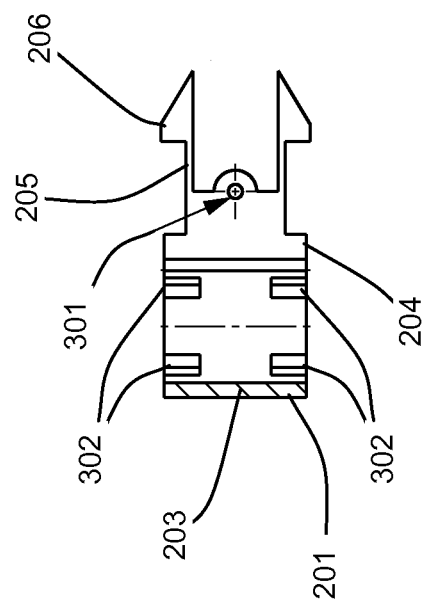

With reference to FIG. 3a, the flanges 204 each define a hole 301 which provided for a fixing means (not shown) such as a bolt, screw or rivet to be threaded through the flanges and tightened so as to tighten and fix the collar 203 around the equipment element. In other words, the holes 301 and corresponding fixing means together provide clamping means for the collar 203. In the present embodiment, the collar 203 is provided with formations 302 on its internal surface. The formations 302 are arranged to grip the equipment element when the clamping means is in place. FIG. 3b illustrates both of the opposing holes 211 provided by the socket 210 that each corresponds to a pair of the projections 206.

Figure 3C:
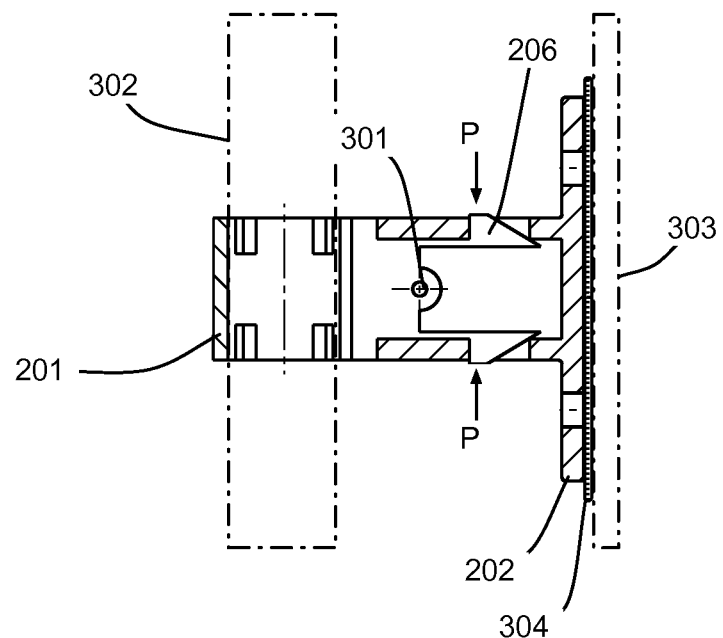

With reference to FIG. 3c, the clip mechanism 207, 209 is arranged to be manually releasable. Pressing the pairs of projections 206 towards each other as indicated by the arrows P in FIG. 3c, disengages the projections 206 from their respective holes 211 and enables the separation of the two parts 201, 202 of the fixing means 107 from each other. In the present embodiment, with reference to FIG. 3c, when the first and second parts 201, 202 are engaged or clipped together, the holes 301, and thus the clamping means, is covered by the socket 210. The clamping means is thereby protected or shielded by the socket 210. In FIG. 3c, the outlines of the equipment element 302 and the substrate 303 are shown in dotted lines. In FIG. 3c, the fixing means is shown bonded to the substrate 303 via a suitable adhesive layer 304.

Figure 4:
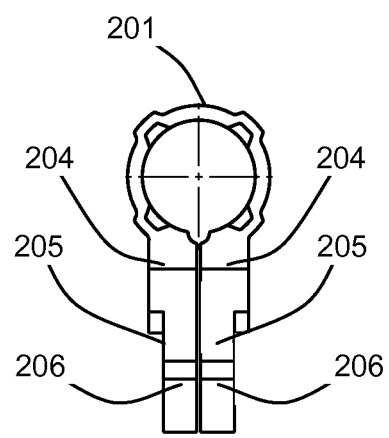
FIG. 4 is a plan view of a first part of the fixing means of FIG. 2.

FIG. 4 shows the first part 201 in plan view so as to further illustrate the two parallel and corresponding flanges 204, arms 205 and projections 206 which are identical in function and thus provide redundancy in the fixing means 107. In other words, two flanges 204 and two male clip parts 207 are provided. In addition, each male clip part 207 comprises two sub-clip parts provided by each of the arm 205 and projection 206 pairs. Redundancy is also provided for the clamping mechanism, firstly by the bolt and holes 301 and secondly by a constriction or clamping effect provided by the socket 210 on the male clip part 207.

In the present embodiment, the first and second parts 201, 202 or the fixing means 107 is each integrally formed. As will be understood by those skilled in the art, each part 201, 202 may be formed from the same or different material in dependence on the application of the fixing means 107. The selected material will take into account the biasing and resilience required for the flexing of the arms 205. The fixing means may thus be formed from any suitable material such as plastics, metal or synthetic composite material or any suitable combination thereof.

In another embodiment, the first clamping mechanism provided by the bolt & holes 301 is omitted with a clamping effect being provided solely by a constriction or clamping provided by the socket 210 on the male clip part 207. This further simplifies installation of the fixing means and reduces its part count.

In a further embodiment, the male clip part is provided by the bracket for fixing to the substrate and the female clip part is provided by the clamp for fixing to the equipment element.

Embodiments of the invention enable equipment elements to be fixed to a substrate quickly and securely. Furthermore, a reduced parts count relative to known fixing means reduces the cost, complexity and weight of the fixing means. The fixing means requires no tools for clipping and unclipping its two parts to attach or detach the equipment element from the structure.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples to shown and described. Accordingly, departures may be made from such details without departure from the scope of applicant's general inventive concept.

The invention claimed is:

1. A fixing assembly to fix an equipment element to a substrate, said fixing assembly comprising:
   a first part comprising a support collar configured to extend around and support an equipment element, flanges each extending from an end of the support collar, and male clip parts extending from each of the flanges, wherein the male clip parts extend from each flange from opposite sides of the flange; and
   a second part comprising a securing device configured to secure the fixing assembly to a substrate and a female clip part, wherein the female clip part includes a socket forming a receptacle having an open end and recesses to receive projections on the male clip parts, wherein said collar fits around the support equipment element such that the flanges come together and allow the male clip parts to be received by the recesses of the socket, wherein each of the recesses receive the projection of one of the male clip parts from one of the flanges and the projection of one of the male clip parts from the other one of the flanges while the male clip parts are received by the receptacle of the socket.

2. The fixing assembly according to claim 1 in which said male and female clip parts are arranged so as to be manually separable.

3. The fixing assembly according to claim 1 wherein each flange is integral with a corresponding two of said male clip parts.

4. The fixing assembly according to claim 3 in which said support collar further comprises a clamp configured to clamp said flanges together so as to fix said support to said equipment element.

5. A fixing assembly configured to fix an equipment element to a substrate, the fixing apparatus comprising:
   a support element configured to support the equipment element, the support element including a collar configured to encircle the equipment element, flanges extending from opposite ends of the collar, a pair of male parts extending from each of the flanges, wherein one of the pair of the male parts extends from one side of the flange and the other one of the pair of mail parts extends from the other side of the flange; and
   a securing device configured to secure the fixing assembly to a substrate, wherein the securing device includes a socket having recesses on opposite sides of the socket and each recess is configured to receive one of the male parts extending from each flange.

6. A clip assembly configured to fix an equipment element to a substrate, the clip assembly comprising:
   a first part including a collar configured to fit around an equipment element, flanges extending from surfaces of the collar and at opposite end regions of the collar, and male clip parts extending from opposite sides of each of the flanges;
   a second part including a mount configured to secure said clip assembly to a substrate and a female clip part including a socket which receives the male clip parts, and
   recesses in the socket configured to receive projections from the mail clip parts, wherein each of the recesses receive the projection of one of the male clip parts from one of the flanges and the projection of one of the male clip parts from the other one of the flanges while the male clip parts are received by socket,
   wherein said male and female clip parts are configured to clip together so as to fix said equipment element to said substrate, wherein each of said male clip parts secure the collar to the equipment element while inserted into the socket.

7. The clip assembly according to claim 6 in which said male and female clip parts are configured to be manually separable.

8. The clip assembly according to claim 6 in which each flange is integral with two of said male clip parts.

9. The clip assembly according to claim 8 further comprising a clamp configured to clamp said flanges together.

10. A clip for fixing an equipment element to a substrate, said clip comprising:
    a support collar configured to extend around an equipment element, wherein the collar includes flanges extending from opposite ends of the collar, and the flanges each include male parts extending from opposite sides of the flange; and
    a mount configured to secure said support collar and the equipment element to a substrate, wherein the mount includes a socket having recesses, and each recess is configured to receive one of the male parts extending from one of the flanges and one of the male parts extending from another one of the flanges.

* * * * *